(12) United States Patent
Yuratich

(10) Patent No.: US 11,056,835 B2
(45) Date of Patent: Jul. 6, 2021

(54) METHODS AND APPARATUS FOR RENDERING ELECTRICAL CABLES SAFE

(71) Applicant: Michael Yuratich, Hamble (GB)

(72) Inventor: Michael Yuratich, Hamble (GB)

(*) Notice: Subject to any disclaimer, the term of this patent is extended or adjusted under 35 U.S.C. 154(b) by 0 days.

(21) Appl. No.: 16/658,853

(22) Filed: Oct. 21, 2019

(65) Prior Publication Data

US 2020/0052442 A1 Feb. 13, 2020

Related U.S. Application Data

(63) Continuation-in-part of application No. 16/133,023, filed on Sep. 17, 2018, now Pat. No. 10,454,219, which is a continuation of application No. 15/422,368, filed on Feb. 1, 2017, now Pat. No. 10,079,457.

(60) Provisional application No. 62/911,225, filed on Oct. 5, 2019.

(51) Int. Cl.
| | | |
|---|---|---|
| *H01R 13/655* | (2006.01) | |
| *H02G 15/105* | (2006.01) | |
| *H02G 3/32* | (2006.01) | |
| *H01R 4/44* | (2006.01) | |
| *E21B 43/12* | (2006.01) | |
| *H02K 11/40* | (2016.01) | |
| *H02K 5/22* | (2006.01) | |
| *H01R 4/2408* | (2018.01) | |
| *H01R 12/59* | (2011.01) | |
| *H01R 9/03* | (2006.01) | |
| *H01R 4/48* | (2006.01) | |
| *H01R 4/2407* | (2018.01) | |

(52) U.S. Cl.
CPC ......... *H01R 13/655* (2013.01); *E21B 43/128* (2013.01); *H01R 4/2408* (2013.01); *H01R 4/44* (2013.01); *H02G 3/32* (2013.01); *H02G 15/105* (2013.01); *H02K 5/225* (2013.01); *H02K 11/40* (2016.01); *H01R 4/2407* (2018.01); *H01R 4/4818* (2013.01); *H01R 9/03* (2013.01); *H01R 9/031* (2013.01); *H01R 12/596* (2013.01)

(58) Field of Classification Search
CPC .... H01R 12/596; H01R 9/032; H01R 4/4818; H01R 13/655; H01R 4/44; H01R 4/2408; H01R 9/031; H01R 4/2407; H01R 9/03; H02G 15/105; H02G 3/32; H02K 11/40; H02K 5/225; E21B 43/128
See application file for complete search history.

(56) References Cited

U.S. PATENT DOCUMENTS

| | | | | |
|---|---|---|---|---|
| 4,201,433 | A * | 5/1980 | Caldwell ............... | H01R 4/646 439/98 |
| 2010/0244598 | A1* | 9/2010 | Nass ...................... | H02K 3/28 310/71 |
| 2016/0024854 | A1* | 1/2016 | Clingman ............. | E21B 17/025 166/378 |

* cited by examiner

*Primary Examiner* — Abdullah A Riyami
*Assistant Examiner* — Justin M Kratt
(74) *Attorney, Agent, or Firm* — Matthew J Patterson

(57) ABSTRACT

A "safe grounding apparatus" (SGA) for safely grounding or neutralizing the electrical conductors for permanent magnet motor (PMM) powered artificial lift systems and methods of practicing the same are disclosed. The SGA of the present invention ameliorates some of the dangers associated with PMM's. Methods of shorting, grounding, testing and monitoring the electrical conductors of a permanent magnet motor in order to safely manipulate the conductors are also disclosed.

16 Claims, 13 Drawing Sheets

METHODS AND APPARATUS FOR RENDERING ELECTRICAL CABLES SAFE

CROSS-REFERENCE TO RELATED APPLICATIONS

This application claims priority to U.S. provisional patent application Ser. No. 62/911,225, filed Oct. 5, 2019. This application is a continuation-in-part of co-pending U.S. patent application Ser. No. 16/133,023, filed Sep. 1, 2018 which is a continuation of U.S. patent Ser. No. 15/422,368, filed Feb. 1, 2017 now U.S. Pat. No. 10,079,457, all of which are herein incorporated by reference in their entirety.

BACKGROUND OF THE INVENTION

Field of the Invention

The present invention relates in general to artificial lift systems used to pump fluids from wells and, and more particularly, to an apparatus and method for rendering a MLE of a motor safe from electrical shock hazards.

Description of the Related Art

Hydrocarbon reservoirs produce fluid from boreholes drilled therein when the reservoir pressure is greater than the flowing pressure at the point of entry to the borehole necessary to lift the fluid to surface. When this condition is not attained it is known in the prior art to operate electric motors to drive pumps downhole, in situ, a method generally known as electric submersible pumping (ESP). The pump increases the flowing pressure sufficiently to lift the fluids to surface.

Most prior art motors used to drive ESPs have been of the three-phase alternating current asynchronous squirrel cage induction type. A power cable including electrical conductors extends from a power source at the surface and runs along the production tubing downhole to the motor. The electrical conductors of the cable are affixed to the motor before installation utilizing a connection commonly referred to as a "pot head". The section of the power cable that includes the pot head is commonly referred to as the extension (MLE). The MLE is typically spliced in the field to one or more sections sometimes referred to as the power cable. Such splices are well known in the industry, such as those described in United States Patent Application number 20130052055, the disclosure of which is incorporated herein in its entirety.

There exist other embodiments of ESP systems in the prior art that utilize permanent magnet motors such as those described in U.S. patent application Ser. No. 15/356,167, the disclosure of which is incorporated herein in its entirety. Such permanent magnet motors may also use three-phase AC power and similar MLEs, pot heads and power cables. However, ESP systems utilizing permanent magnet motors differ from induction motor systems in that when the motor shaft rotates (in the absence of supply power) it acts as a generator and can impress a significant voltage across the cable conductors, resulting in an electrical shock hazard for anyone touching the conductors. The motor may be rotated by, among other things, fluid running through the pump in certain situations such as while running the system in hole, removing the system from the hole or simply the draining of the production fluid from above the pump during a power failure or power shutdown. In addition, unlike centrifugal pumps, progressive cavity pumps do not pass fluid freely and breakout friction must be overcome in order to rotate. When running in, the tubing connected to such progressive cavity pumps remains essentially void of fluid and at low pressure, while well pressure builds on the bottom of the pump. At some depth the friction may be overcome and the pump will suddenly turn. The aforementioned hazards during running in are infrequent and may not occur and therefore makes the hazards sudden and unexpected. In such situations a technician or operator may be unaware that the motor is rotating and may be producing significant voltage. It should be appreciated by those skilled in the art that in such situations the manual manipulation of the electrical conductors of the cable, such as during a splicing operation, of a permanent magnet motor poses a significant risk of electrical shock and sparking. Sparking may even cause explosions if certain gases are present in the environment near the splicing operation.

What is needed is an apparatus and method that renders a power cable of a permanent magnet motor ESP system safe for splicing and other operations.

SUMMARY OF THE INVENTION

In accordance with some aspects of the present disclosure, systems and methods related to a novel artificial lift system are disclosed.

Various embodiments of an apparatus for attachment to a plurality of power conductors electrically coupled to a permanent magnet motor are disclosed.

In some aspects of the present invention, the apparatus is a safe grounding apparatus (SGA) and includes a plurality of shorting conductors electrically coupled to the power conductors; and a connection for electrically shorting the shorting conductors.

In still other aspects of the present invention, the SGA includes a grounded connector for grounding the power connectors to earth.

In yet other aspects of the present invention the SGA includes a module for monitoring physical conditions of the permanent magnet motor including voltage, resistance, speed and frequency including at least one monitoring device that measures the physical parameter.

In yet other aspects of the present invention a method includes rendering a plurality of conductors electrically coupled to a permanent magnet motor safe.

In still other aspects of the present invention a method includes rendering a plurality of power conductors electrically coupled to a permanent magnet motor safe includes electrically coupling a plurality of shorting conductors to the power conductors and shorting the shorting conductors. The method further includes grounding the shorting conductors.

In still further aspects of the present invention a method includes monitoring the power conductors for various electrical attributes.

One general aspect includes a safe grounding apparatus for attachment to a motor lead end electrically coupled to a permanent magnet motor including the motor lead end including a plurality of electrical conductors at least partially enclosed within a layer of insulation. The safe grounding apparatus also includes an electrical connector assembly including a plurality of electrical connectors adapted to be selectively electrically coupled to the plurality of electrical conductors of the motor lead end. The safe grounding apparatus also includes a bus bar adapted to be electrically coupled to the plurality of electrical connectors and adapted to electrically short the electrical conductors.

Implementations may include one or more of the following features. The safe grounding apparatus where the motor lead end is overwrapped with a metallic armor, the apparatus further including a conductor adapted to electrically couple to the metallic armor and the bus bar. The safe grounding apparatus further including the bus bar mounted within a module, the module further including at least one monitoring device adapted to monitor at least one condition of the motor lead end and the permanent magnet motor. The safe grounding apparatus where the shorting conductors coupled to the bus bar is adapted to produce a braking torque in the permanent magnet motor.

One general aspect includes a method for rendering a motor lead end coupled to a permanent magnet motor safe, the method including providing a plurality of electrical connectors. The method also includes electrically coupling the plurality of electrical connectors to a plurality of electrical conductors of a plurality of power cables of the motor lead end. The method also includes electrically coupling the electrical conductors to at least one shorting conductor. The method also includes electrically coupling the at least one shorting conductor to a bus bar. The method also includes monitoring at least one condition of at least one of the motor lead end and the permanent magnet motor.

Implementations may include one or more of the following features. The method further including electrically grounding the at least one shorting conductor to earth. The method where the plurality of electrical conductors includes an insulation, the method further including removing a portion of the insulation and thereby exposing the electrical conductors.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
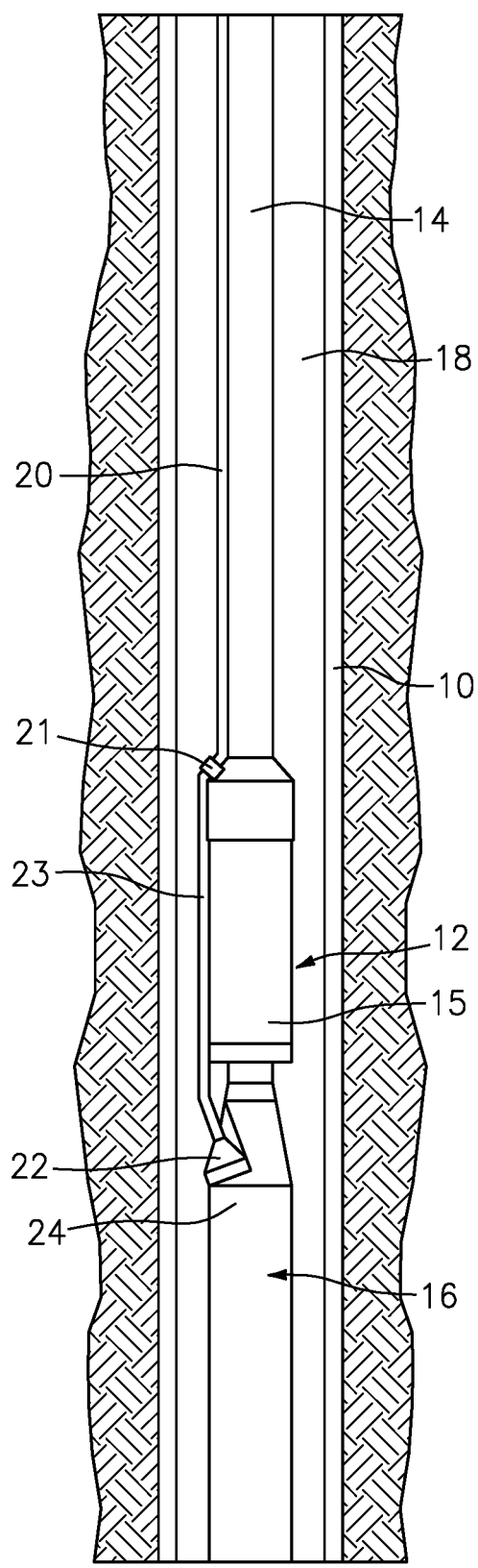
FIG. 1 is side representation of an artificial lift system within a wellbore including embodiments of the present invention.

The examples disclosed herein relate to a "safe grounding apparatus" (SGA) for safely grounding, neutralizing (or shorting), testing and monitoring the electrical conductors for permanent magnet motor (PMM) powered artificial lift systems and methods of practicing the same. The SGA of the present invention ameliorates some of the dangers associated with PMMs. The present invention provides a method of shorting, grounding and monitoring the electrical conductors of a permanent magnet motor in order to manipulate the conductors, for example, to splice the motor lead end (MLE) of a cable to a power cable. Referring to FIG. 1, there is shown a well 18 having a casing 10 and an ESP 12 coupled to a permanent magnet motor (PMM) 16 disposed in the well. ESP 12 is typical of the prior art and includes a pump and seals (not shown) and is further hydraulically connected to production pipe 14 to pump production fluids to the surface. PMM 16 may be a three phase, alternating current, type permanent magnet motor known in the prior art. MLE 23 may be comprised of an armored cable having three insulated electrical conductors enclosed therein, as will be described in more detail herein below. MLE 23 is mechanically and electrically connected to PMM 16 at pot head connector 22 in motor housing 24. Initially, MLE 23 extends upwardly along ESP 12 for several feet and in some cases for one hundred or more feet depending on the pump length and particular installation. Motor lead 23 is electrically connected to power cable 20 by connection 21 which connection may comprise a mechanical splice as will be explained more fully hereinafter. Power cable 20 may also be comprised of an armored cable having three insulated electrical conductors enclosed therein and extends upwardly toward the surface. For purposes of clarity and convention, the length of cable electrically attached to PMM 16 will be referred to herein as an MLE. For example, once an MLE is spliced to a section power cable the entire spliced length will continue to be referred to as an MLE. As successive sections of power cables 20 may be spliced to MLE 23 and may include another splice connection 21 (not shown) and the MLE increases in length and is ultimately connected to a power source, and can include a variable frequency drive at the surface (not shown).

Figure 2:
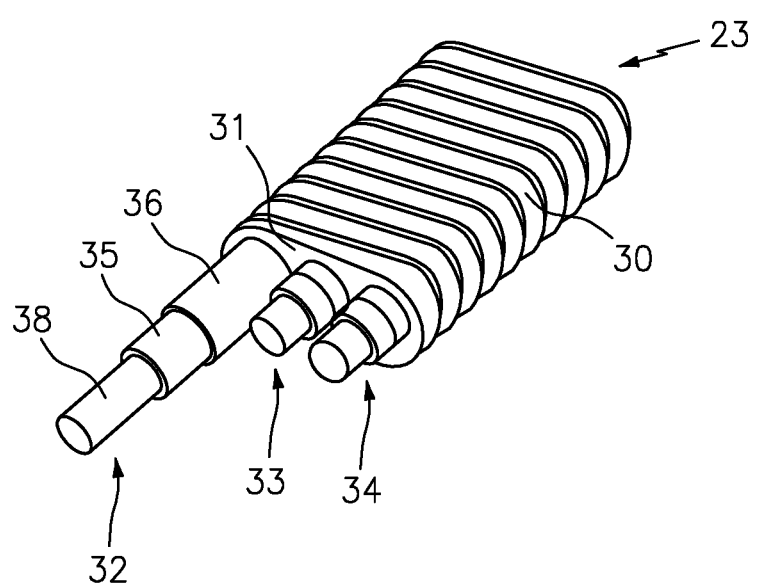
FIG. 2 is a perspective view of a prior art power cable.

Now referring to FIG. 2 there is shown a typical ESP power cable which is shown as MLE 23. Such ESP power cables may be flat as shown or may be round and may be comprised of various protective, insulative and conductive materials. An exemplary disclosure of ESP power cables for use with the present invention can be found at Petrowiki at the url address http://petrowiki.org/ESP power cable #cite ref-r1 1-0, the disclosure of which is incorporated herein in its entirety. Still referring to FIG. 2, insulated conductors 32, 33, 34 include conductor 38 which is typically comprised of a solid copper (or other efficient electrically conducting material) core but may be comprised of a plurality of smaller strands. The core, or conductor, 38 is typically enclosed within a layer of insulation 35 which is comprised of an electrically insulating material such as EPDM or FEP or the like. In the embodiment of MLE 23 shown there is also a metallic lead protective layer 36 (comprised of lead or a lead alloy) disposed around insulation 35. The three insulated conductors 32, 33, 34 are encapsulated within a protective insulating jacket 31 which protects lead insulation 36 and insulation 35 and may comprised of a nitrile or EPDM rubber material. MLE 23 is overwrapped with metallic armor 30 which may be comprised of a galvanized steel and provides mechanical protection to insulated conductors 32, 33, 34. For purposes of simplicity and clarity, and without departing from the scope of the present invention, MLE 23 and power cable 20 as used herein can be assumed to be comprised of the elements described immediately above with reference to FIG. 2.

It is known in the prior art to mechanically connect PMM 16, ESP 12 and at least a few sections of production pipe 14 at the surface. It is further known to attach pot head connector 22 to PMM 16 and MLE 23 to the side of ESP at the surface. With the various components assembled at the surface as described, an operator lowers the assembly into well 18. There are various situations within the art that necessitate the placement of a splice connection 21 in the embodiment described. For instance, a first splice connection 21 between MLE and power cable 20 is typically made on site as ESP 12 and PMM 16 are positioned within well 18. An operator further attaches successive sections of production pipe 14, continues to lower the assembled components into well 18, and makes splice connections 21 as needed until ESP 12 is positioned at a predetermined depth within the well. In addition, MLE 23 may be damaged, either during installation in the well or thereafter, and necessitate that a splice connection 21 be placed to restore electrical connectivity to PMM 16. A typical splice connection 21 may comprise any known connector including as described herein above with reference to US20130052055.

As described herein above, and with reference to FIG. 2, a typical splice connection 21 of the prior art is a field splice connector that may require trimming or cutting the cable end, removing the wound armor 30, stripping back the protective insulating jacket 31, preparing the conductors 38 by removing layers 35, 36, installing a conducting splice member such as a ferrule crimp, and the use of insulating and amalgamating tapes for encapsulating the splice. The process may take two hours or more. Many of these steps require a skilled technician to use his bare hands exposing him to the potential of a shock hazard. As will be described more fully herein below, the present invention ensures that at all times during a splicing operation there is no hazardous voltage present on the conductors 38 being worked on. Since PMM 16 is the voltage source of concern, the afore mentioned hazards are prevented by the present invention at the splice end of MLE 23. In order to facilitate existing safe working practices for splicing, and to guard against certain failure modes of the hazard prevention means, additional steps are taken with the section of power cable yet to be spliced as disclosed herein above and below.

Figure 3:
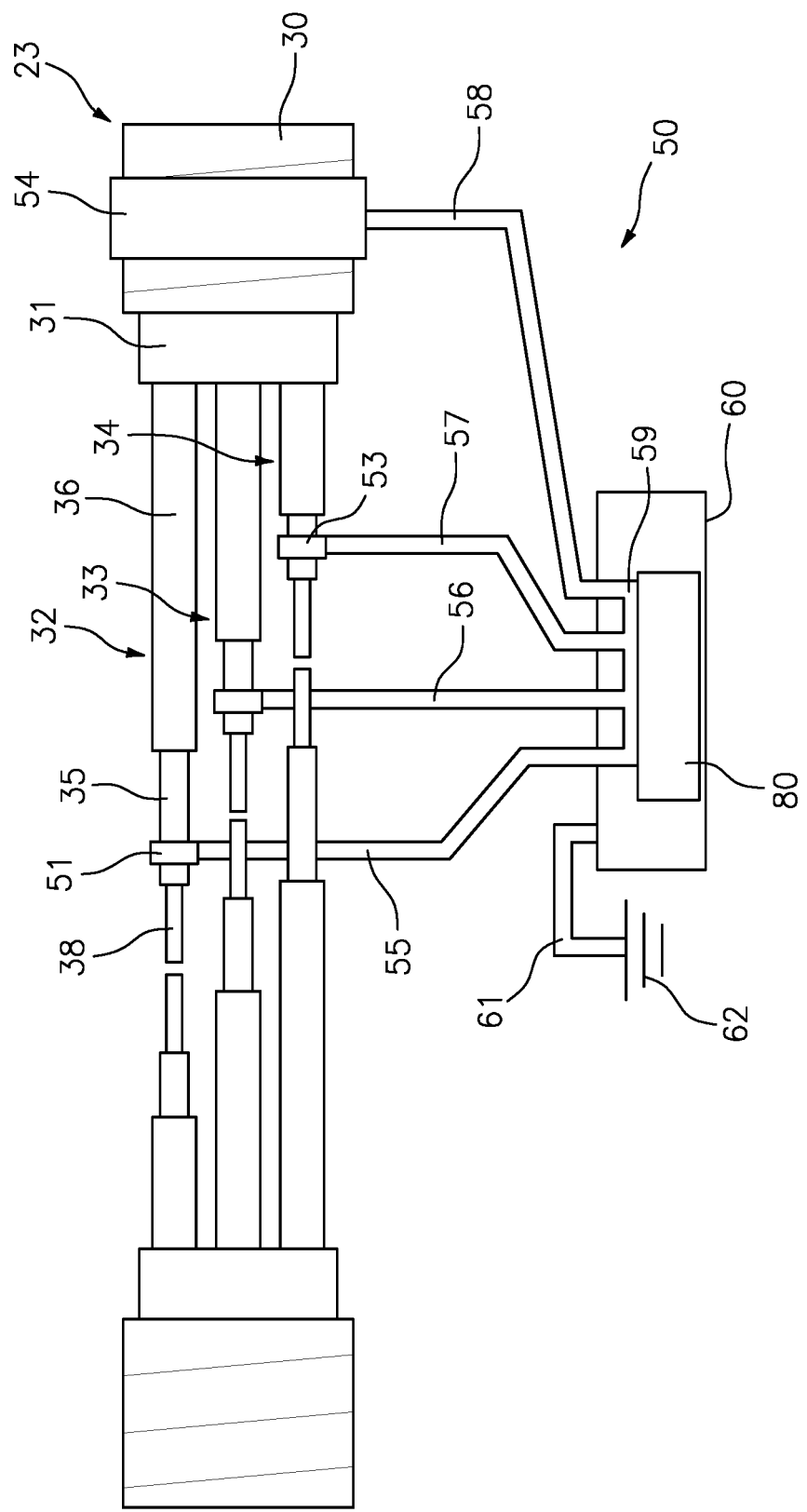
FIG. 3 is a schematic representation of an electrical grounding system of an embodiment of the present invention.

Referring now to FIG. 3, there is shown MLE 23 previously prepared for such a field splice to power supply cable 20 and an embodiment of an SGA 50 in accordance with the present invention. Shown in the figure is MLE 23 which is connected to PMM 16 via pot head connector 22 (FIG. 1). As described herein above with reference to FIG. 2, MLE 23 may comprise, metallic armor 30, a protective insulating jacket 31 inside of which are disposed three insulated conductors 32, 33, 34. As is known in the art, electrical current is carried by conductors 38 to and from the motor, and as described herein above if the shaft of PMM 16 is rotating a significant voltage may be present within insulated conductors 32, 33, 34.

As discussed herein above, and as will be appreciated by those skilled in the art, that while splicing MLE 23 to power cable 20 the conductors 38 are exposed and present hazards such as shock and sparking. The primary voltage hazard arises when contact is made across two conductors 38. It is an aspect of the present invention that if conductors 38 are shorted together there can be no voltage across them. If the shaft of PMM 16 is rotating, the internal generator voltage of the motor will however drive a current through a short circuit of conductors 38, limited by the impedance of the motor winding and the shorted conductors. The present invention takes advantage of the known characteristic of permanent magnet motors, that this current flow will result in a braking torque and advantageously a reduction in the speed of the motor and pump. The current flow may be detected as hereinbelow described so as to provide an indication of rotation and hence a warning to stop work as a further safety precaution.

Still referring to FIG. 3, an embodiment of SGA 50 is shown connected to MLE 23 to render the insulated conductors 32, 33, 34 safe. It is an important aspect of the present invention that SGA 50 be positioned between an operator and PMM 16. Clamp 51 may comprise a piercing type clamp that when positioned as shown on insulation 35 of insulated conductor 32 it pierces through the insulation and makes electrical contact with conductor 38. In some embodiments of the present invention clamp 51 may be installed over multiple layers of insulation such as insulation 35 and metallic lead protection 36 and wherein the clamp pierces the multiple layers of insulation and makes contact with conductor 38. Clamp 51 is electrically coupled to conductor 55 which is in turn connected to buss bar 57 mounted inside of enclosure 60. Clamps 52, 53 are similarly in electrical contact with conductors 38 of insulated conductors 33, 34 and are respectively coupled to conductors 56, 57 and connected to buss bar 57. SGA 50 further includes clamp 54 electrically coupled to metallic armor 30 which is electrically connected to buss bar 59 via conductor 58. As described herein below, the present invention provides an additional safety feature in that junction box 60, as well as buss bar 59, may be electrically grounded via conductor 61 run to a suitable ground 62. As one skilled in the art can appreciate, with SGA 50 of the present invention installed as described any electrical potential in motor lead cable 23 is shorted and may further be run to ground 62 rendering insulated conductors 32, 33, 34 safe to handle. Although the embodiment of SGA 50 is shown with piercing clamps 51, 52, 53, separate conductors 56, 57, 58 and an enclosure 60, any assembly of components that short pairs of conductors 38 and which may also run the conductors and armor 30 to ground is within the scope of the present invention.

Given the aforementioned description of SGA 50 if the exemplary pair of conductors 38 are isolated from earth, and only one conductor is touched by an operator then no shock or sparking hazards can result. However, if an earth fault on one of the conductors 38 occurs in PMM 16 or MLE 23 during work on the MLE then a hazard exists from the other conductors to earth 62. It should be appreciated that this secondary fault case is well known in electrical installation practice using the "IT" floating power system. In normal electrical installations this secondary fault is not immediately hazardous and an insulation monitor may be used to detect and warn of its occurrence. It should be further appreciated however that when working on conductors 38 in utilizing the present invention there may be an immediate touch hazard. Therefore, certain embodiments of the present invention preferably includes a further step of shorting the conductors 38 to ground 62 via conductor 61. Although armor 30 is inevitably in contact with metallic parts of the production tubing, and therefore likely in contact with ground, it is preferable to explicitly ground it as with conductor 58.

EXAMPLE METHODS OF EMPLOYING AN SGA OF THE PRESENT INVENTION

The reliability of splices and other means of connection is an essential part of the economics of artificial lift systems and ESP's in particular, wherein the loss of production and rig costs associated with a repair are extremely costly. Therefore it is a further objective of the present invention to allow existing established practice for induction type motors to be followed as closely as possible when permanent magnet motors are used. The splicing operation of the exemplary method described herein below closely resembles that practiced in the art of induction motor driven ESP systems.

An exemplary method of employing the SGA 50 of the present invention is illustrated with reference to FIGS. 3 and 4. With PMM 16 installed within 18 (FIG. 1) MLE 23 is prepared for splicing to power cable 20 by installing SGA 50 onto the MLE as will be described directly herein below. Prior to splicing, MLE 23 is typically presented to an operator as a straight cable that has been terminated by, for example, sawing or using insulated shears (while wearing gloves). The operator, while using insulated gloves, removes a portion of wound armor 30, strips back the protective insulating jacket 31, and exposes the insulated conductors 32-34.

Figure 4:
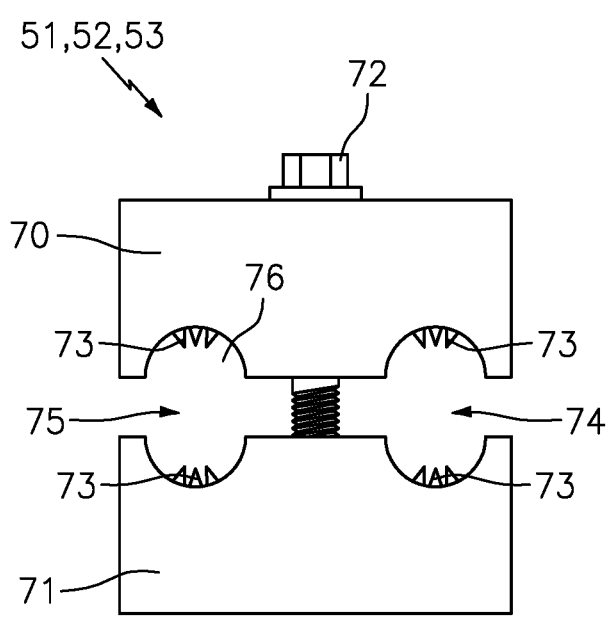
FIG. 4 is an end view of a piercing clamp in accordance with an embodiment of the present invention.

Referring now to FIG. 4 there is shown an exemplary embodiment of piercing clamps 51, 52, 53 that may be installed, preferably while wearing gloves. Piercing clamps 51, 52, 53 may advantageously comprise a modified version of piercing clamp IPC 1/0-#2 manufactured and offered for sale by Ilsco Kupler®. The piercing clamps include an insulating top block 70, an insulating bottom block 71, and isolated clamping bolt 72. Upper block 70 and lower block 71 include a metal bar (not shown), which metal bar includes teeth 73 mounted on either end of the bar, within conductor terminals 74, 75 formed within the upper and lower block pairs. The aforementioned modification of the piercing block includes the removal of a bulkhead and a second pair of toothed bars as a single piercing position is desired to minimize damage to insulation 35. During installation of SGA 50, each of the conductors 38 of the three insulated conductors 32-34 and shorting conductors 55-57 are connected to separate piercing clamps in respective pairs as shown in FIG. 3. An end of a shorting conductor 55-57, which shorting conductor may advantageously be insulated, is inserted within conductor channel 75 of piercing clamp and against bulkhead 76. Similarly an insulated end of a conductor 38 of MLE 23 is inserted into and through conductor channel 74 of the piercing clamp. Bolt 72 is tightened to urge bottom block 71 towards top block 70 and forcing teeth 73 to penetrate insulation 35 of the respective insulated conductor and making electrical contact with the conductor 38 encapsulated therein. It should be noted that the clamp should be positioned on the insulation 35 as close as practicable to the point to which the insulation of conductor will subsequently be trimmed back. This allows the piercing holes in the insulation caused by teeth 73 to be easily sealed and protected as part of the normal splicing operations to seal the splice. Once SGA 50 is installed as described the shock and spark hazards have been neutralized and the splicing operation may continue with less caution. As is normally practiced in the art, the operator prepares the conductors 38 for splicing by removing insulation layers 35, 36 to expose the conductors. It should be noted that such an embodiment of a piercing clamp may accommodate all commonly employed submersible pump conductor sizes. Alternative embodiments of the piercing clamp described above include a device that may have molded shorting and earth connections and a more compact piercing/cutting head, that may preferably be installed without tools, such as lever or screw operated.

Power cable 20 may be comprised of the same or similar components as MLE 23 as described herein above. The same operation of preparing power cable 20 for splicing may typically performed on each end the power cable at least to expose the conductors. In the art it is common practice, and necessary for safely practicing the present invention, to short the conductors of the uphole end of power cable 20, using a terminal block for instance. If a second SGA (FIG. 25) is used in place of the terminal block, the present invention has the advantage of monitoring the splice during the completion of the splice. Once SGA 50 is installed as described, power cable 20 may be brought into position as shown in FIG. 3. In such a position, MLE 23 may be spliced to power cable 20 by, for example, installing a conducting splice member, such as a ferrule crimp (not shown), onto conductors 38 of both MLE 23 and power cable 20. The piercing clamps 51-53 may then be removed one-by-one (or combined) and then, using insulating and amalgamating tapes, the splice is encapsulated and completed. The danger of shock and sparking does not exist at this stage of the splicing operation because MLE 23 is shorted at the uphole end. Splice connection 21 may alternatively be performed by any known method included those disclosed herein before. It is within the scope of the present invention that the same SGA 50 and method described herein above may be used to join subsequent lengths of power cables 20 to each other at for instance, penetrators, joints, junction boxes and wellhead outlets.

The embodiment of SGA 50 in FIG. 3 may advantageously also include a module 80 mounted within junction box 60. Module 80 may be variously connected to buss bar 59 and/or the shorting conductors 55-57 and to various testing and monitoring devices such as devices to measure voltage, current and impedance. Module 80 may further include a display or other device to demonstrate the connectivity and thereby the effectiveness of SGA 50 to render the electrical conductors safe.

With reference to FIG. 3 in general, and module 80 specifically, various embodiments of the present invention referred to herein above will be described. It is advantage of the present invention that SGA 50 has the ability to continuously monitor the continuity of the shorted conductors 38, such that operators can be instantly warned of a protection fault such as by indicators and annunciators included in module 80 (not shown). It is a further advantage of the present invention to be able to detect whether the shaft of PMM 16 is actually turning, since personnel can then cease work temporarily as a further safety measure. Yet another advantage of the present invention is the ability to measure the speed of rotation of the shaft of PMM 16 since the internal voltage of a PMM is exactly proportional to speed, the current (of the same frequency) can be determined. At sufficiently low speed the voltage will not be hazardous. The ability to determine rotational speed as well as the shorted motor current may give valuable insight into the nature of the cause of rotation.

It should be appreciated by those skilled in the art that in the shorted system of the present invention, for each motor phase there is a continuous loop through the motor winding, the motor star point and back up through the other phase connections. Taking advantage of these inherent properties, various conditions of PMM 16 may be realized, monitored, measured and otherwise employed to provide further safety to operators.

As an example of the foregoing, for continuity one of the shorting conductors, say conductor 55 for example, may be passed through the core of a small transformer (not shown). The transformer primary can be energized by a simple oscillator circuit, causing current to be induced in a phase conductor, returning via the other shorting conductors 56, 57. A low value resistance, perhaps only a few milliohms, can be inserted in series with each of the shorting conductors 56, 57, and the voltage drops across them may be sensed using known methods. There will no voltage on a connection that is open circuit. The frequency of the oscillator should be high enough for the transformer to work well but low enough that the series inductance of the motor windings presents too high an impedance to allow a measurable current flow.

Again, and as another example, for detection of rotation of the shaft of PMM 16, it will be apparent a rotating motor shaft will generate current into a short circuit in proportion to its internal voltage (emf) and series impedances. This alternating current is measurable from the voltage drop across the aforementioned resistances. The current readily reaches many amperes and can be distinguished from the continuity circuit by frequency range and large amplitude. It is known that the frequency of the current from PMM 16 is inherently an exact indicator of speed. An alternative embodiment to utilizing resistances, other current transducers such as flux gate and hall effect sensors as made by LEM (lem.com) may be used.

An important aspect of all the aforementioned methods of motor current measurement is that they work continuously from DC through the maximum frequency of the motor. These methods work for ESP systems using permanent magnet motors having used for PCPs as well as centrifugal pumps. As an example, a 4-pole motor rotating at 1800 rpm generates current at a frequency of 60 Hz but at 180 rpm it is only 6 Hz. A motor wound for say 600V operation at 180 rpm would produce a hazardous 60V at 18 rpm (48V being a widely accepted maximum safe voltage for qualified personnel). However at 18 rpm the frequency of the current would be only 0.6 Hz. This example shows the advantages of the features of module 80 of the present invention. Conventional widely available handheld meters would be ineffective at performing such monitoring in that are designed to either measure DC or to measure AC above a few Hz. Even on DC+AC ranges the same limitation applies. At 0.6 Hz there may be a slight indication when set to DC or DC+AC but on AC there will no reading at all.

Figure 5:
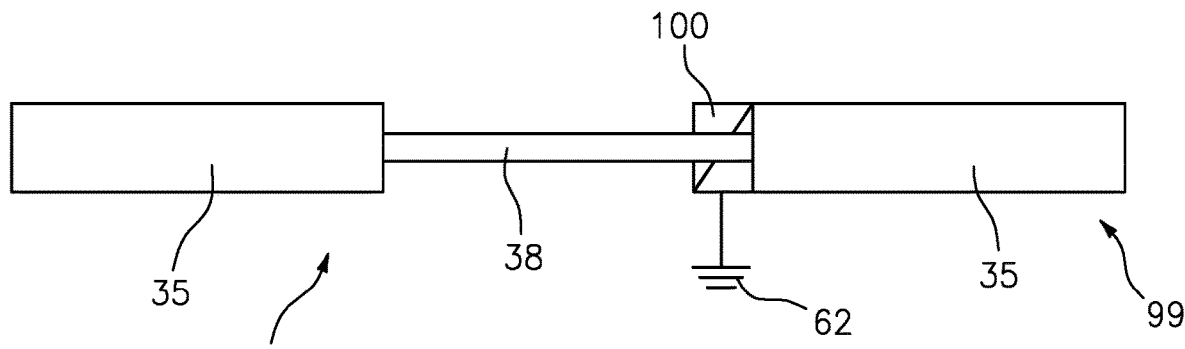
FIG. 5 is a schematic representation of an electrical grounding system in accordance with an embodiment of the present invention.
Figure 6:
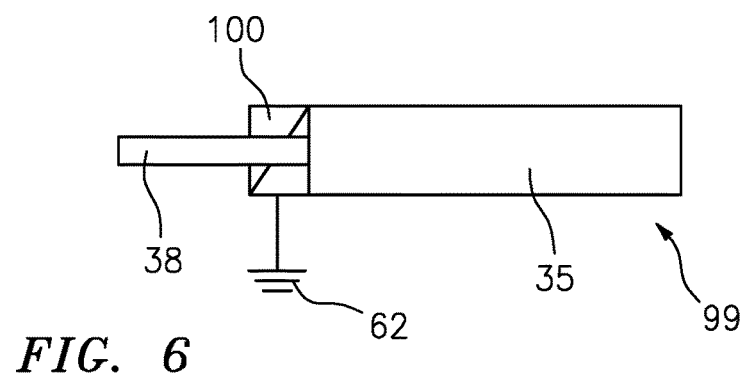
FIG. 6 is a schematic representation of an electrical grounding system in accordance with an embodiment of the present invention.
Figure 7:
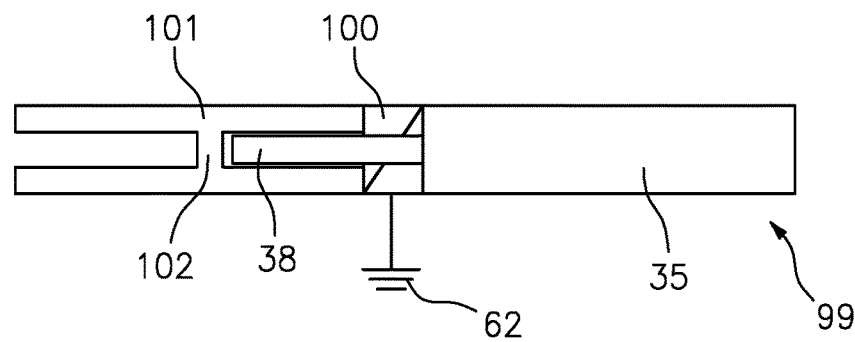
FIG. 7 is a schematic representation of an electrical grounding system accordance with an embodiment of the present invention.
Figure 8:
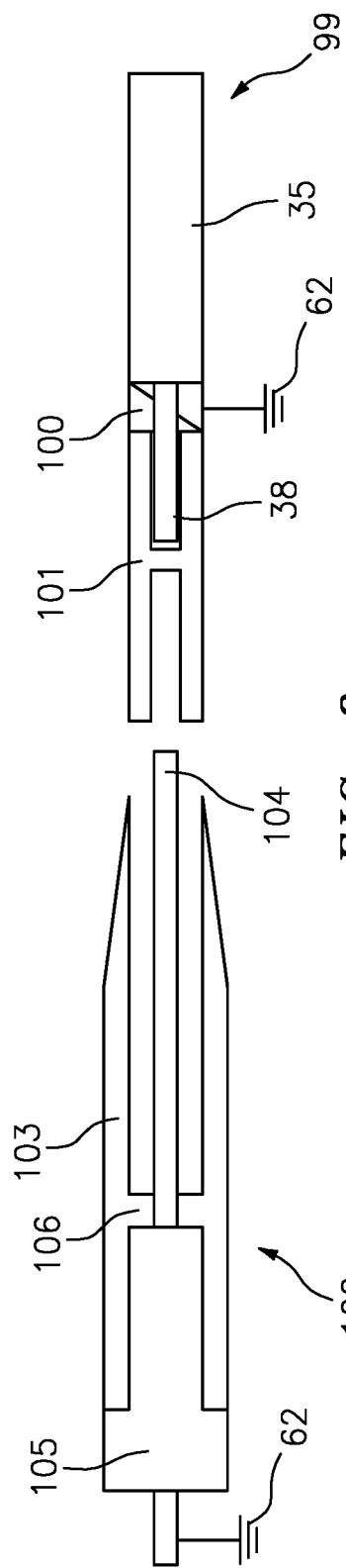
FIG. 8 is a schematic representation of an electrical grounding system accordance with an embodiment of the present invention.
Figure 9:
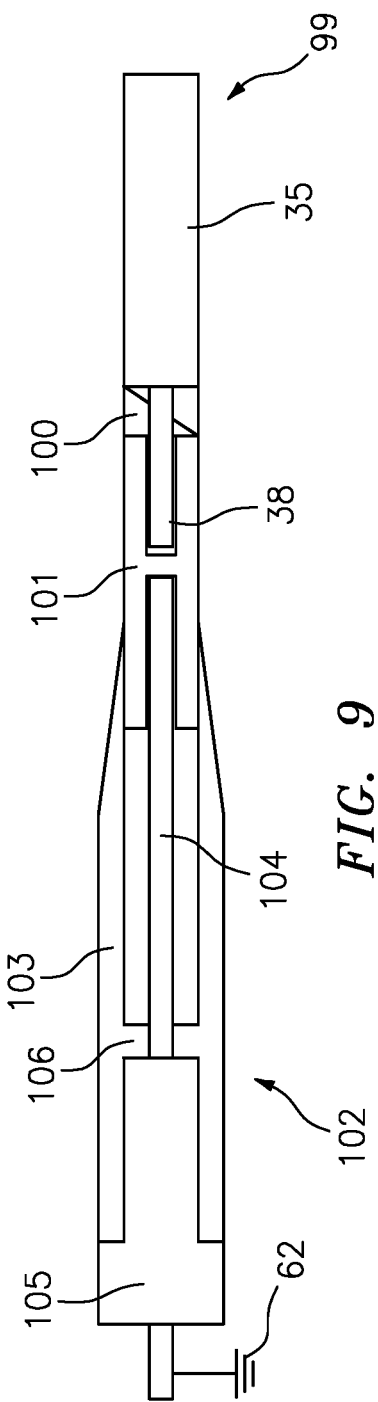
FIG. 9 is a schematic representation of an electrical grounding system accordance with an embodiment of the present invention.
Figure 10:
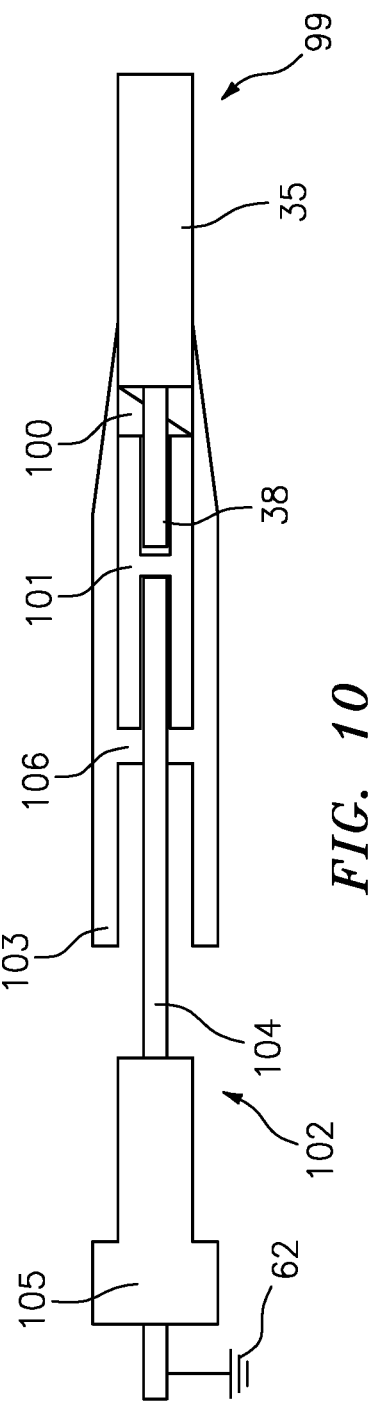
FIG. 10 is a schematic representation of an electrical grounding system accordance with an embodiment of the present invention.
Figure 11:
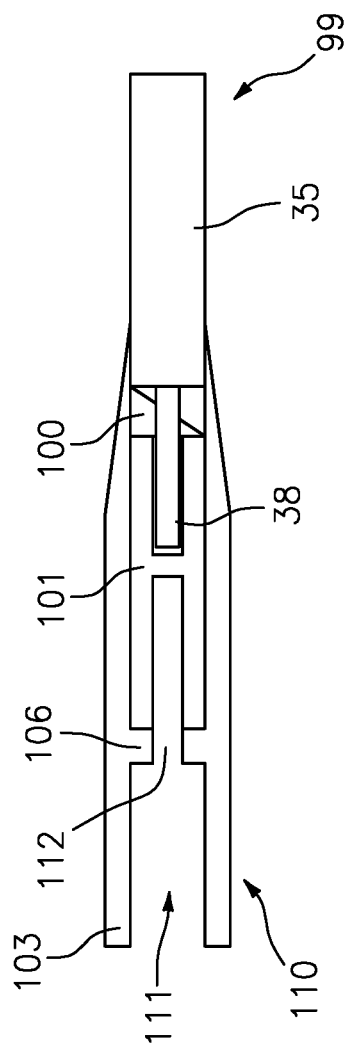
FIG. 11 is a schematic representation of connector assembly accordance with an embodiment of the present invention.
Figure 12:
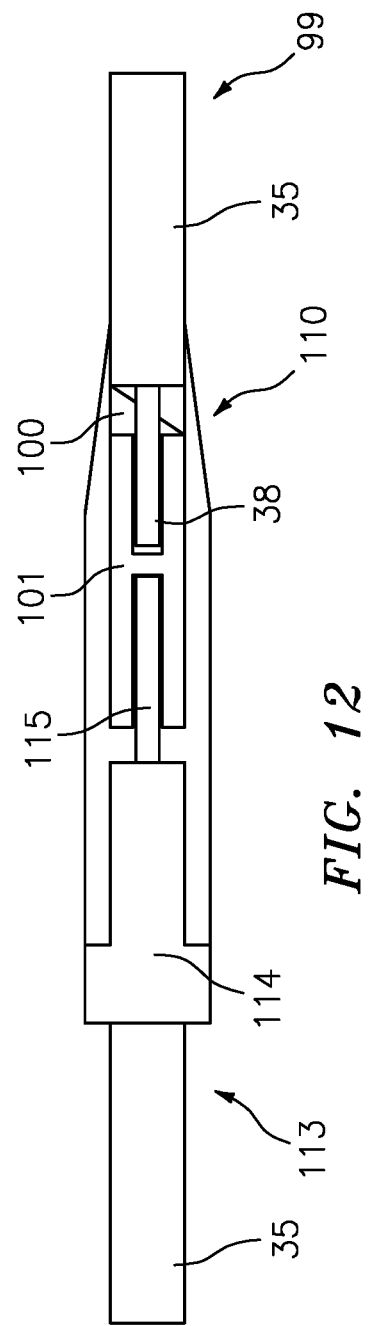
FIG. 12 is a side view of connector assembly accordance with an embodiment of the present invention.

Now with reference to FIGS. 5-12 the use of an SGA in association with the field fabrication of a female connector assembly (110 in FIGS. 11-12) as part of splice connection 21 (FIG. 1) will be described. Referring to FIG. 5, a portion of single insulated conductor 32 of MLE 23 is shown with a portion of insulation 35 stripped off exposing conductor 38. A single conductor 38 is shown in the figures for simplicity's sake although a multiple conductor MLE 23 is contemplated by the present disclosure. Prior to the stripping operation the conductor is grounded using an SGA 50 on either side of conductor as described herein above. Cable end 99 is connected to a motor 16 (FIG. 1) as described herein before. After stripping insulation 35 from conductor 38 a grounding collar 100 comprising a split sleeve (or clamp) is applied to the conductor and connected to ground 62. Grounding collar 100 is comprised of an electrically conducting material and can be the same approximate diameter as the outer dimensions of insulation 35. Once grounding collar 100 is connected to ground 62 SGA 50 can be removed and conductor 38 can be cut to a predetermined length as shown in FIG. 6. Because cable end 99 is grounded via grounding collar 100 there exists no shocking hazard in conductor 38. Referring to FIG. 7 a conducting ferrule 101 is applied to conductor 38 and crimped thereto by any standard crimping process. Conducting ferrule 101 is comprised of cylindrical shaped electrically conducting material having an outer diameter suitable to mate with conducting ferrule 101 and the same approximate diameter as the outer dimensions of insulation 35. Although conducting ferrule 101 can comprise a fully hollow cylindrical shape it can include a gage stop to facilitate assembly of the connector assembly as will be more fully described herein after. Now referring to FIG. 8 there is shown a connector sleeve assembly 102 comprised of connector body 103, a grounding pin 104 and an installation handle 105. Grounding pin 104 is comprised of an electrically conductive material having a diameter approximately the same as conductor 38 and is secured within installation handle 105 and is further connected to ground 62. Installation handle 105 can be comprised of any suitable material and is releasably secured within connector body 103 wherein it can be secured by a snug or press fit. Connector body 103 is comprised of any suitable non-electrical conducting material and has a generally hollow cylindrical shape and can further include shoulder 106. Referring to FIG. 9, connector sleeve assembly 102 is positioned about conducting ferrule 101 such that grounding pin 104 is in electrical connection with an inner diameter of conducting ferrule 101 and connector body 103 is positioned over the outer diameter of the conducting ferrule. Once positioned as shown grounding collar 100 can be disconnected from ground 62 and it should be appreciated that there exists no shocking hazard by virtue of the fact that grounding pin 104 is connected to ground 62. Referring next to FIG. 10, connector body 103 is released from installation handle 105 and the connector sleeve is assembled onto conducting ferrule 101 such that shoulder 106 is in contact with the conducting ferrule and a portion of the sleeve is positioned over grounding collar 100 and insulation 35 of cable end 99. A completed female connector assembly 110 is shown in FIG. 11 with connector body 103 secured and sealed to cable end 99 by any suitable means such as tape or a compression gland and comprises connector cavity 111 which terminates at shoulder 106. Shoulder 106 includes a hole 112 which is sized to accommodate grounding pin 104 and a male connector pin 115 (FIG. 12) but which is small enough, in conjunction with the depth of connector cavity 111, to prevent an operator from inadvertently accessing conducting ferrule 101 rendering female connector assembly 110 safe. Now referring to FIG. 12 there is shown a male connector assembly 113 comprise of a connector body 114 and a male connector pin 115. Male connector pin 115 is comprised of an electrically conductive material and is secured within connector body 114 and electrical coupled to an electrical conductor, similar to conductors 38 (FIG. 3) within insulation 35, portion of insulation 35 can be removed, exposing the conductor, such that it can be coupled to an SGA 50 and can further be connected to a power source that can include a variable frequency drive at the surface (not shown). It should be noted that male connector assembly 113 can be safely fabricated at a manufacturing facility or in the field because it is not connected to motor 16 and therefore the shocking hazards described herein before are not present. While the foregoing embodiment is directed at the safe field fabrication of a female receptacle, one practiced in the art would be able to rearrange the parts so as to make a shrouded male pin termination to MLE 23 insulated cable end 99. Collar 100 was left inside the connector. However this is not essential. For example, if conducting ferrule 101 had a continuous bore, then in FIG. 9 once grounded pin 104 is engage with conducting ferrule 101, the collar 100 could be removed and the ferrule pushed down by the continued insertion of connector body 103. If will further be appreciated that connector body 103, grounding installation handle 105 and male connector assembly 113 can be made in multiphase form.

Figure 13:
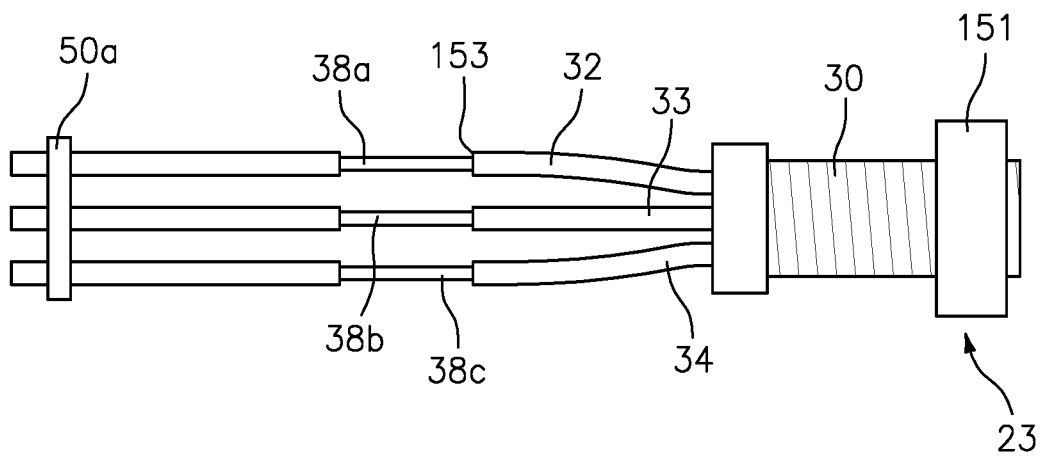
FIG. 13 is a schematic representation of an electrical grounding system accordance with an embodiment of the present invention.

As described herein before, splice connections 21 (FIG. 1) are well known in the art and there exists many commercially available connectors for fabricating such splices in the field. One such well known splice connector is a Gator Splice® connector manufactured and sold by Power Feed-Thru Systems and Connectors LLC which is designed to splice three conductor flat power cables into a round threaded connection. Although such known connectors are available, their application for making field splices to permanent magnet motors exposes an operator to the same shocking hazards described herein before. With reference to FIGS. 13-20 a connector assembly 160 (FIG. 20) and method that provides for a safe field splice for use with a permanent magnet motor will now be described. As disclosed herein above, while MLE 23 is connected to permanent magnet motor 16 there is a potential risk of a shocking hazard because fluids can travel through the pump causing the motor to rotate and produce a voltage. It should be recognised by those skilled in the art that the embodiment of this particular method is similar to that of a door airlock system (i.e. clean room) wherein at least one of two SGA's (doors) are always shorting the power cable as in one door always closed. The MLE 23 is first cut a convenient distance such as two feet above the splicing point, using hot gloves and cutting tools such as a saw or insulated shears, since voltage may be present. Preferably an SGA will be in position at the free end of the cable such as on the cable spool as hereinbefore described, before the cut is made. This SGA can be monitored for current to verify there is no rotation prior to the cutting operation and so reduce the likelihood of voltage appearing on the cut conductors. An embodiment of initially preparing the cable can now be understood as follows. The MLE 23 is marked with the splicing point, and the armor 30 is carefully parted using a saw or other suitable tool a convenient distance such as two feet, higher up the cable, avoiding cutting into the conductor insulation. The armor 30 and protective coverings are then unwrapped sufficiently that the insulated conductors 32, 33, 34 are exposed and SGA 50a can be applied. The safely shorted and grounded cable can then simply be cut off above SGA 50a, the armor 30 peeled down past the splice point and insulation removed to point 35 all as hereinbefore described in relation to FIG. 13. Preferably the free end of the cable will be safely grounded and shorted, in which case it does not matter if the insulation is damaged when the armor is parted. Backshell 151 can be slid down the cable using the airlock principle hereinbefore described in relation to FIG. 15a. Referring now to FIG. 13, there is shown MLE 23 being prepared for a fitting of connector assembly 160, similar to that of a field splice in accordance with the disclosure herein before with reference to FIG. 3. Still using hot gloves (or other suitably safe methods), armor adapter (backshell) 151 is first slid over the cut cable, ready for eventual completion of the connector. The armor 30 and protective insulation 35 (FIG. 2) are then peeled off the MLE 23 down to a distance below the splicing point in accordance with the manufacturer's instructions, so exposing insulated conductors 32, 33, 34. SGA 50a is then applied near the free end of MLE 23 as described herein above and can include piercing clamps 51a, 51b (FIG. 4) to pierce the insulation layer of insulated conductors 32, 33, 34 and contacting the conductors 38a, 38b, 38c. SGA 50a is then preferably connected to ground. It should be understood by those skilled in the art that conductors 38a, 38b, 38c can all be grounded to 62 individually or collectively, all referred to herein as a bus bar, using SGA 50a or other similar grounding apparatus so long as they are connected to a point having the same potential. SGA 50a may now be monitored as an additional safety step for current flow as an indication of motor rotation. Now referring specifically to FIG. 13, a suitable amount of insulation of the three insulated conductors 32, 33, 34 is removed to a point 153 which is a prescribed distance from armor 30. This distance can be prescribed, for example, by a manufacturer of a particular connector assembly 160.

Figure 14:
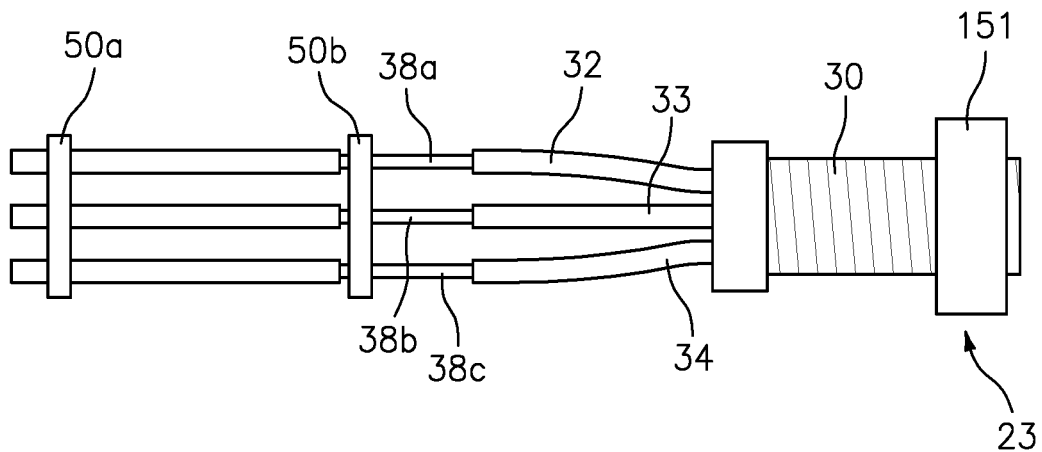
FIG. 14 is a schematic representation of an electrical grounding system accordance with an embodiment of the present invention.
Figure 15:
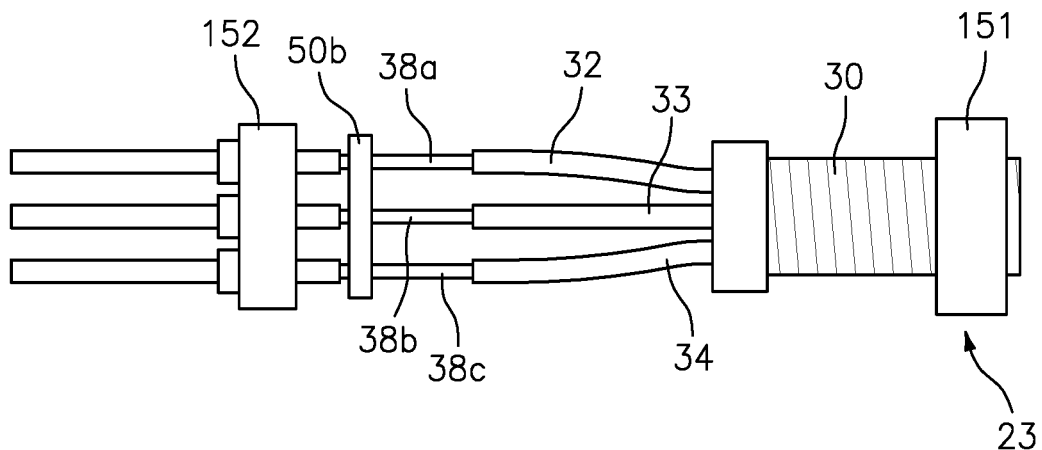
FIG. 15 is side view of a connector assembly accordance with an embodiment of the present invention.
Figure 16:
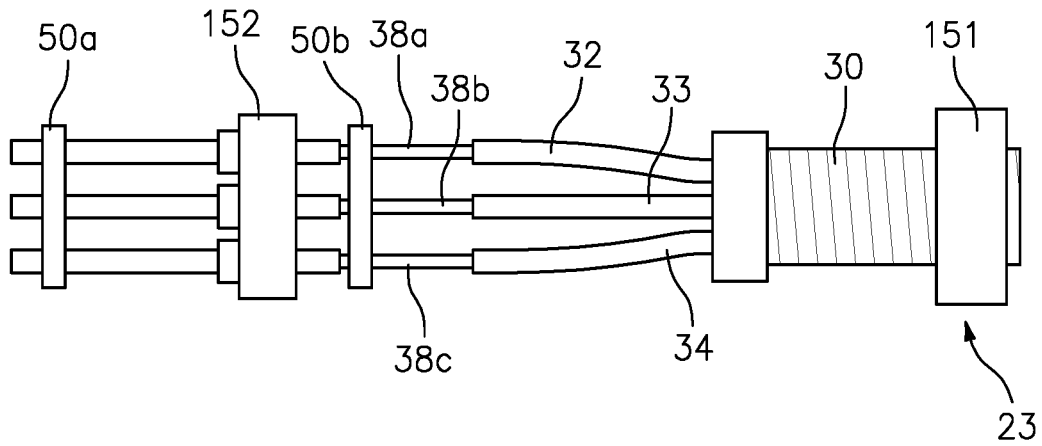
FIG. 16 is side view of a connector assembly accordance with an embodiment of the present invention.
Figure 17:
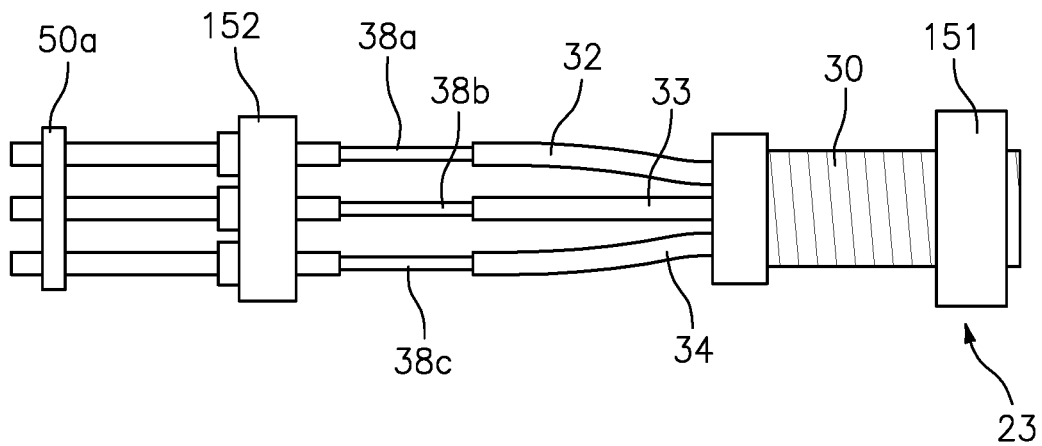
FIG. 17 is side view of a connector assembly accordance with an embodiment of the present invention.
Figure 18:
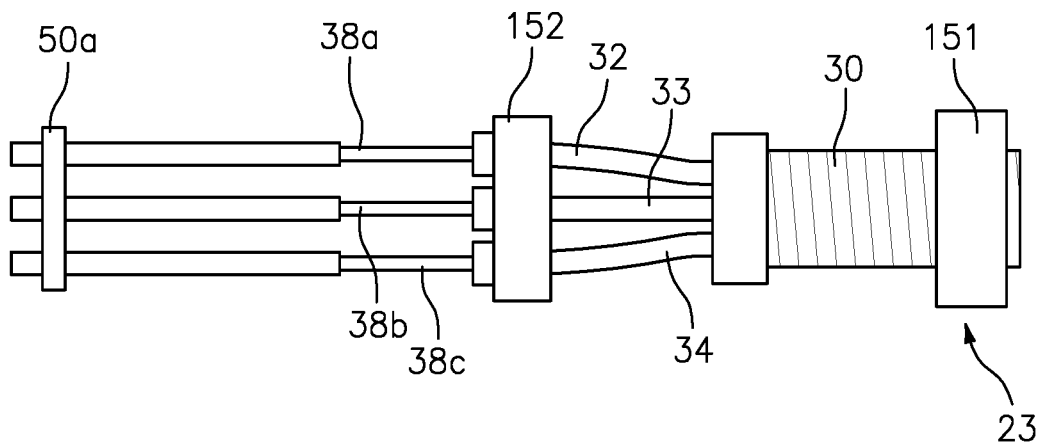
FIG. 18 is side view of a connector assembly accordance with an embodiment of the present invention.
Figure 19:
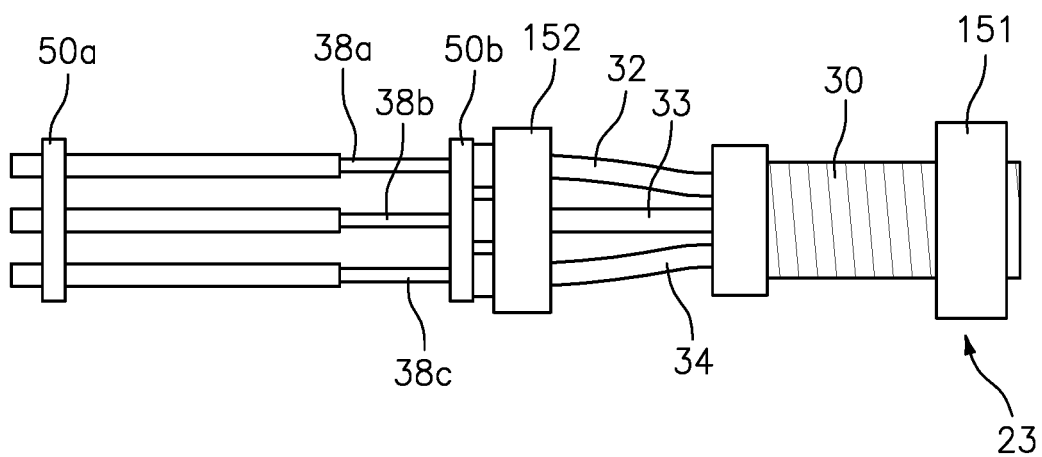
FIG. 19 is side view of a connector assembly accordance with an embodiment of the present invention.
Figure 20:
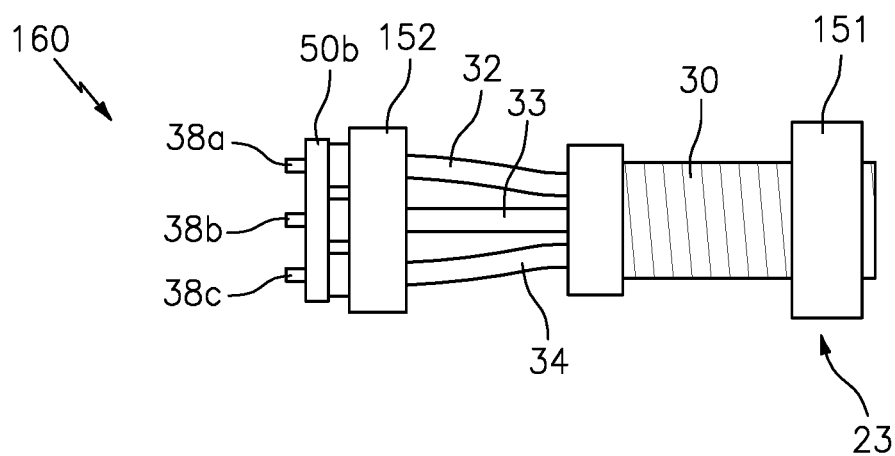
FIG. 20 is side view of a connector assembly accordance with an embodiment of the present invention.

Referring next to FIG. 14, there is shown SGA 50*b* applied directly to conductors 38*a*, 38*b*, 38*c* and further can be electrically connected to ground by any suitable means. The next step of safely fabricating connector assembly 160 is shown with reference to FIG. 15 wherein SGA 50*a* has been removed and connector block 152 has been slid over the three insulated conductors 32, 33, 34. This step can be accomplished without the need of hot gloves because MLE 23 is grounded via SGA 50*b*. SGA 50*a* is reinstalled onto the three insulated conductors 32, 33, 34 as shown with reference to FIG. 16. Referring now to FIG. 16 there is shown the next step in the preparation of connector assembly 160 wherein SGA 50*b* has been removed allowing connector block 152 to be slid over conductors 38*a*, 38*b*, 38*c* and onto the three insulated conductors 32, 33, 34 closest to the armour 30 as shown in FIG. 18. Referring now to FIG. 19, SGA 50*b* is reinstalled on bare conductors 38*a*, 38*b*, 38*c* proximate connector block 152. Bare conductors 38*a*, 38*b*, 38*c* can then be cut proximate SGA 50*b* yielding connector assembly 160 with the MLE 23 rendered in a safe condition. In the embodiment shown, conductors 38*a*, 38*b*, 38*c* are positioned within cable ferrules of connector block 152. Connector assembly 160 can be fitted with other connector assembly parts such as connector pins, insulating block and protective shell (not shown), using hot gloves, insulating tools and other known methods to produce a female (or male) final connector assembly. Any known compatible male (or female) connector can be screwed onto connector assembly 160 and connected to a power source and can include a variable frequency drive at the surface (not shown) to permanent magnet motor 16. It will be appreciated that the foregoing procedures are applicable to any situation where components must be slid over a cable while keeping the cable shorted and grounded. As example would be the individual shrouding of 32, 33, 34 in FIG. 17 rather than a single three-phase connector block 152. Individual shrouding can arise when it is desired to splice to individual conductors such as in some known types of well-head penetrator.

It should be noted that the present invention further includes the termination of a MLE 23 with a "touch safe" connector (such as female connector assembly 110 in FIGS. 11, 12) that would in itself be connected to the electrical connectors and allow manipulation and connection of the MLE to the power cable with minimal risk of electrical shock or sparking. The present invention further includes a removable terminating connector (not shown) for connecting with the touch safe connector and safely terminating MLE 23 thereby. It is within the scope of the present invention that the terminating connector includes the features and components of monitoring module 80 described herein above.

Figure 21:
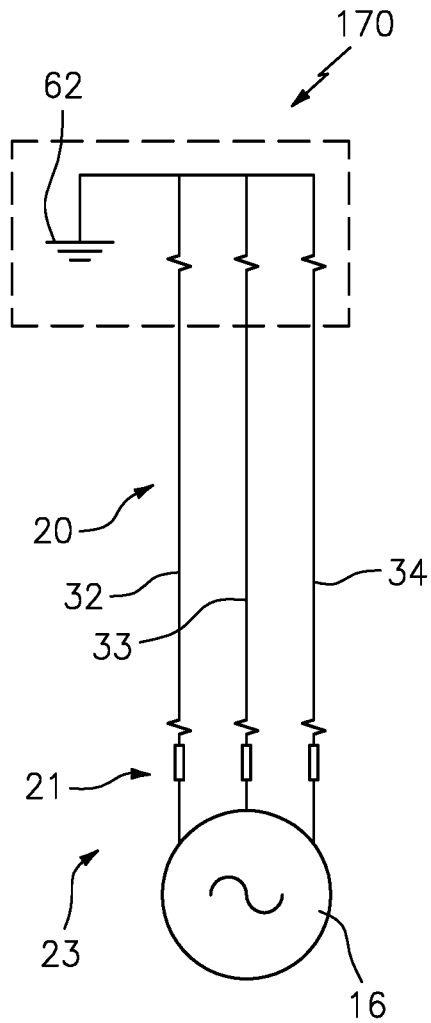
FIG. 21 is a schematic representation of an electrical grounding system accordance with an embodiment of the present invention.
Figure 22:
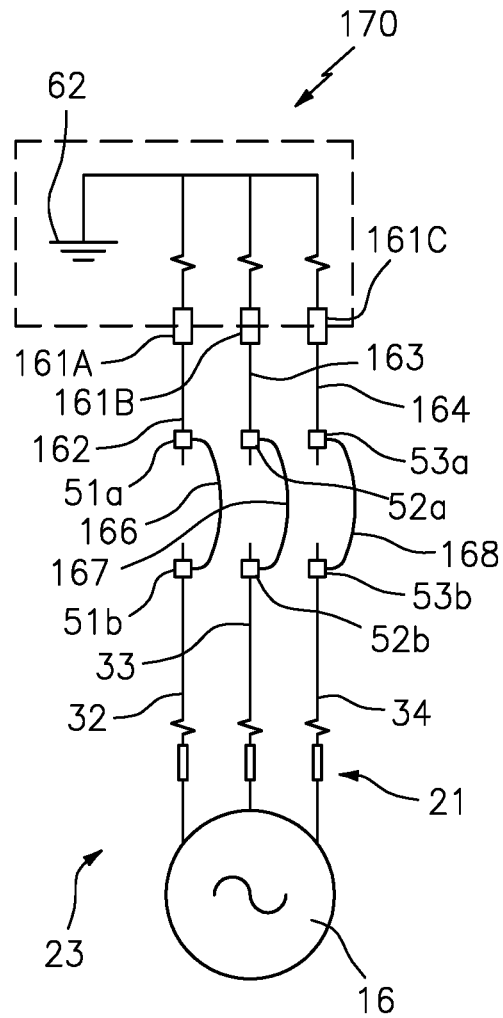
FIG. 22 is a schematic representation of an electrical grounding system accordance with an embodiment of the present invention.
Figure 23:
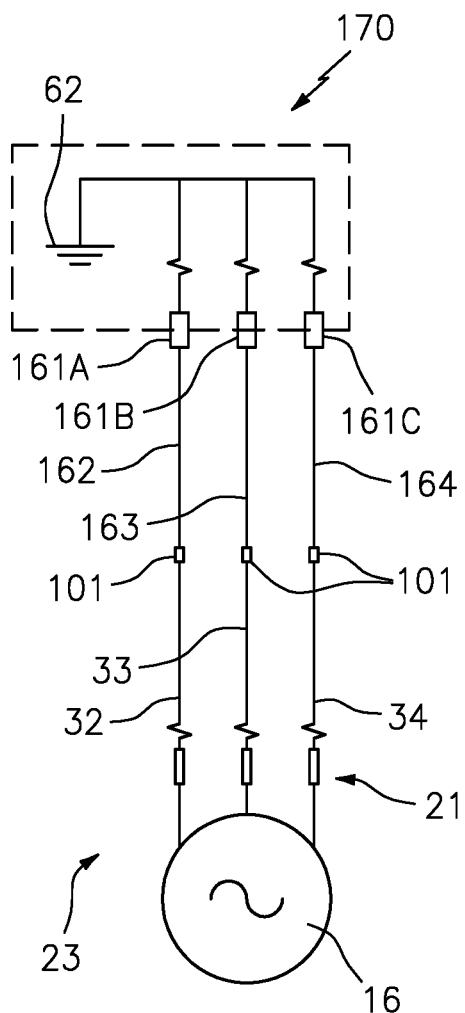
FIG. 23 is a schematic representation of an electrical grounding system accordance with an embodiment of the present invention.
Figure 24:
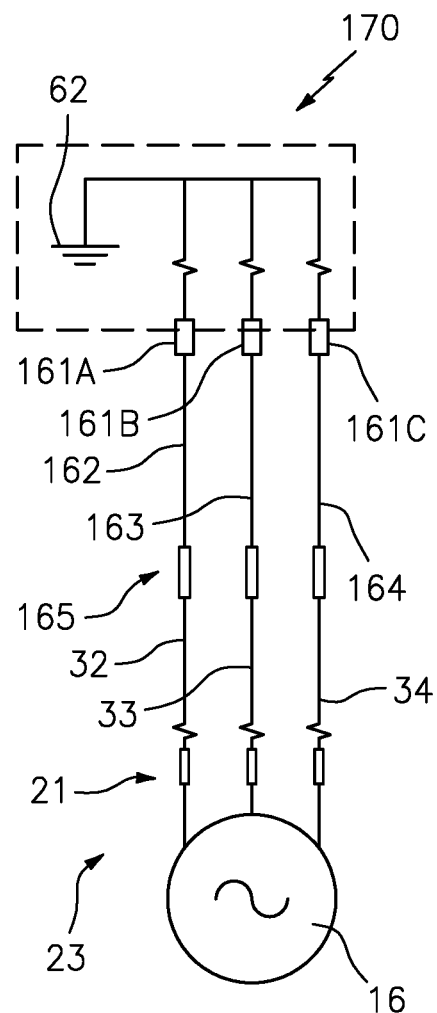
FIG. 24 is a schematic representation of an electrical grounding system accordance with an embodiment of the present invention.

Now with reference to FIGS. 21-24 the use of an SGA 170 in association with the disposing, often referred to as "running", a permanent magnet motor 16 into a well 18 (FIG. 1) as part of a normal operation. SGA 170 can comprise various embodiments similar to those disclosed herein above and can include a module for monitoring physical conditions of the permanent magnet motor including voltage, resistance, speed and frequency. Referring first to FIG. 21, there is shown a schematic of a permanent magnet motor 16 electrically coupled to power cable 20 by first splice connection 21 to MLE 23. Power cable 20 can comprise a continuous length of cable selected to from a length long enough to position permanent magnet motor 16 at a predetermined depth in a well 18 (FIG. 1). Such a continuous length of power cable 20 is typically transported to a well on a spool or reel (not shown) and in certain embodiments SGA 170 is mounted to the spool and is electrically coupled to insulated conductors 32, 33, 34 and further is electrically connected to ground 62. As described herein above, motor 16 is attached to a pump 12 (FIG. 1), which can be an ESP, and is run into the hole (well 18) while power cable 20, is unwound off a spool. It should be appreciated that, if SGA 170 is not applied as disclosed, while permanent magnet motor 16 and pump 12 are being run in the hole, the pump may be forced into rotation (due to fluids moving through the pump) causing the permanent magnet motor to turn and to produce hazardous voltage along, and at the surface end, of power cable 20. Still referring to FIG. 17, power cable 20 can be a continuous length to first splice connection 21 to motor lead end 23 wherein the first splice connection can be performed as described herein before or as will be described herein after. The embodiment shown renders power cable 20 safe at the surface in that while insulated conductors 32, 33, 34 are shorted together and can be connected to ground there is no voltage in the conductors. Now referring to FIG. 22, there is shown an extended operation of that described herein above with respect to FIG. 17 wherein a second splice, which may be the first splice prepared in the field, needs to be made between insulated conductors 32, 33, 34 and subsequent conductors 162, 163, 164 respectively, wherein the subsequent conductors are electrically coupled to SGA 170 which are further coupled to ground 62. In this particular embodiment, subsequent conductors 162, 163, 164 are connected to the top side of wellhead penetrator 161 and conductively extended through the penetrator to the lower side. As is known in the art, penetrators have many forms, some separable by connectors or terminals and others where the cable passes through and is sealed, and wherein all such penetrators fall within the scope of the present disclosure. Such a need for a splice may be necessitated by expending of a length of power cable 20 on a particular spool, damage to the cable or other various reasons. In operation, the splice 165 is performed similar to that described herein above with respect to FIGS. 3 and 4 and begins with the removal of metallic armor 30 (FIG. 2). As described herein before, MLE 23 is cut using hot gloves and normal precautions, armor 30 is peeled back as well as another protective materials exposing insulated conductors 32, 33, 34. Now referring to FIG. 22, a first jumper wire 166 is electrically connected to a pair of piercing clamps 51*a*, 51*b*. Piercing clamp 51*b* is coupled to insulated conductor 32 and piercing clamp 51*b* is coupled to subsequent conductor 162 rendering the conductors grounded via SGA 170 and ground 62. Similarly, a second jumper wire 167 is electrically connected to a pair of piercing clamps 52*a*, 52*b*. Piercing clamp 52*b* is coupled conductor 33 and piercing clamp 52*a* is coupled to subsequent conductor 163 rendering the conductors grounded via SGA 170 and ground 62. In addition, a third jumper wire 168 is electrically connected to a pair of piercing clamps 53*a*, 53*b*. Piercing clamp 53*b* is coupled conductor 34 and second piercing clamp 53*a* is coupled to subsequent conductor 164. rendering the conductors grounded via SGA 170 and ground 62. Because the subsequent conductors 162, 163, 164 are shorted together and grounded via ground 62 there exists no shocking hazard at the surface. Referring now to FIG. 23, with jumper wires 166, 167, 168 installed as described herein above, the terminated ends of insulated conductors 32, 33, 34 are brought into close proximity with subsequent conductors 163, 164, 165 and a conducting ferrule 101 (FIG. 7) can applied to each of the pairs of conductors and crimped thereon by any standard crimping process and as described herein above. Although disclosed as a conducting ferrule 101, any known type of conductor-to-conductor connection is contemplated. Once each conducting ferrule 101 is installed, the respective jumper wire can be safely removed as it is safely bypassed by the ferrule connection. It should be appreciated by those skilled in the art that during, and after, the installation of the conducting ferrules as disclosed there exists no shocking hazard at the surface. Referring now to FIG. 24, second splice 165 can be completed by, for example, applying insulating and amalgamating tapes as described herein above. The danger of shock and sparking does not exist at this stage of the splicing operation because all of the conductors are shorted at the surface by SGA 170. Splice connection 165 may alternatively be performed by any known method including those disclosed herein before. It is within the scope of the present disclosure that SGA 170 and methods described herein above may be used to join subsequent lengths of power cables 20 to each other at for instance, penetrators, joints and wellhead outlets.

Still referring FIGS. 21-24, SGA 170 can comprise any of the embodiments of SGA disclosed herein. It should be noted that SGA 170 can be installed at the spool end of power cable 20 or the top side of penetrators 161A, 161B, 161C to render the conductors safe for personnel positioned at the surface performing the splicing operations disclosed herein or performing other maintenance or operation activities. These particular embodiments are useful in that a single SGA can be used (in lieu of multiple SGA's) and that the conductors are rendered safe from a shocking hazard during the entire splicing operation. Once splice 165 is complete, conductors 162, 163, 164 can be connected to a power source and can include a variable frequency drive (not shown) at the surface to permanent magnet motor 16 and SGA 170 can be electrically uncoupled from the conductors.

Figure 25:
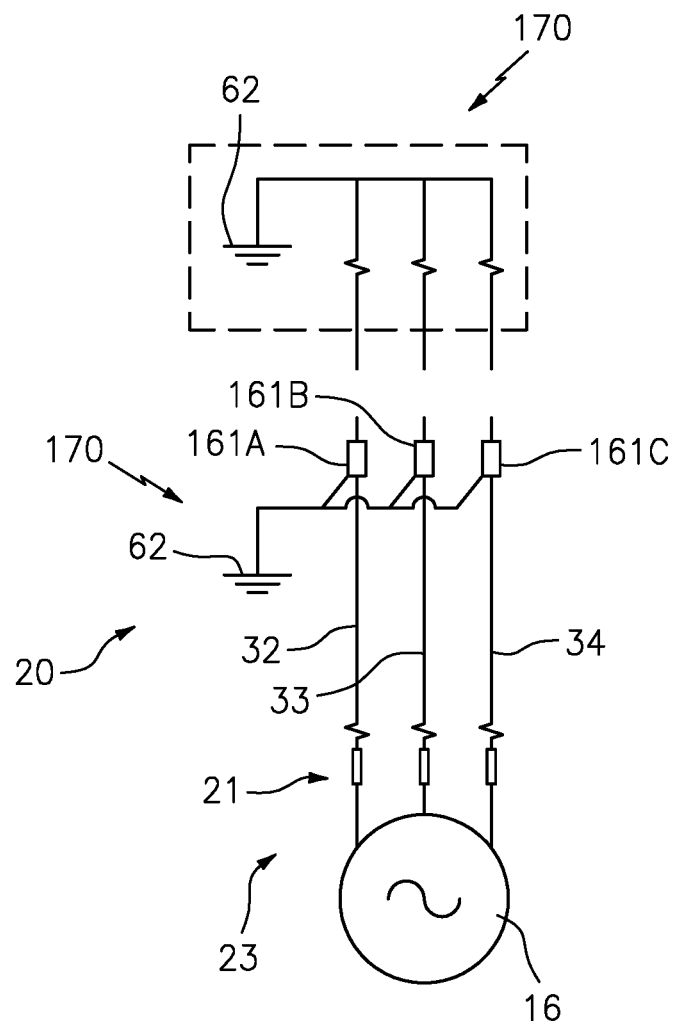
FIG. 25 is a schematic representation of an electrical grounding system accordance with an embodiment of the present invention.

Referring now to FIG. 25, there is shown an embodiment, similar to that described with reference to FIG. 3 herein above, of performing a second splice disclosed with reference to FIG. 22 herein above wherein a second splice needs to be made between insulated conductors 32, 33, 34 and subsequent conductors 162, 163, 164 respectively, and wherein the subsequent conductors are electrically coupled to SGA 170 which are further coupled to ground 62. In this particular embodiment, subsequent conductors 162, 163, 164 are shown electrically connected to SGA 170 which can be mounted to a spool but can also be sealed within top side of penetrators 161A, 161B, 161C (FIG. 22). As disclosed herein above, such a need for a splice may be necessitated by expending of a length of power cable 20 on a particular spool, damage to the cable or other various reasons. In operation, a second splice 165 (FIG. 23) is performed similar to that described herein above with respect to FIGS. 3 and 4 and begins with the removal of metallic armor 30 (FIG. 2). Prior to terminating any of insulated conductors 32, 33, 34 a second SGA 170 is electrically coupled to insulated conductors 32, 33, 34 and is further coupled to ground 62. In operation, insulated conductors 32, 33, 34 can then be terminated and removed from the SGA 170 of FIG. 22. Because the subsequent conductors 162, 163, 164 are grounded via ground 62 there exists no shocking hazard at the surface and second splice 165 can be performed as disclosed herein above.

While the foregoing is directed to embodiments of the present invention for use in conventional tubing deployed ESP systems, other systems utilizing permanent magnet motors where a similar risk of shock hazard exists such as electric drilling, rigless completions, coiled tubing and the like are within the scope of the present invention.

While the foregoing is directed to embodiments of the present invention, other and further embodiments of the invention may be devised without departing from the basic scope thereof, and the scope thereof is determined by the claims that follow.

What is claimed is:

1. A safe grounding apparatus for attachment to a motor lead end electrically coupled to a permanent magnet motor comprising:
   the motor lead end including a plurality of electrical conductors at least partially enclosed within a layer of insulation;
   an electrical connector assembly comprising a plurality of electrical connectors adapted to be selectively electrically coupled to the plurality of electrical conductors of the motor lead end;
   a bus bar adapted to be electrically coupled to the plurality of electrical connectors and adapted to electrically short the electrical conductors; and
   wherein the motor lead end is overwrapped with a metallic armor, the safe grounding apparatus further comprising a conductor adapted to electrically couple to the metallic armor and the bus bar.

2. The safe grounding apparatus of claim 1, further comprising a grounded conductor adapted to connect to the bus bar and extend therefrom and electrically ground the electrical conductors to earth.

3. The safe grounding apparatus of claim 1, further comprising the bus bar mounted within a module, the module further comprising at least one monitoring device adapted to monitor at least one condition of the motor lead end and the permanent magnet motor.

4. The safe grounding apparatus of claim 3, wherein the at least one monitoring device measures a voltage, a current or an impedance.

5. The safe grounding apparatus of claim 4, wherein the module includes a display, an indicator or an annunciator coupled to the at least one monitoring device.

6. The safe grounding apparatus of claim 3, wherein the at least one condition includes a speed of the permanent magnet motor.

7. The safe grounding apparatus of claim 1, wherein the electrical conductors coupled to the bus bar are adapted to produce a braking torque in the permanent magnet motor.

8. A method for rendering a motor lead end coupled to a permanent magnet motor safe, the method comprising:
   providing a plurality of electrical connectors;
   electrically coupling the plurality of electrical connectors to a plurality of electrical conductors of a plurality of power cables of the motor lead end;
   electrically coupling the electrical conductors to at least one shorting conductor;
   electrically coupling the at least one shorting conductor to a bus bar; and
   monitoring at least one condition of at least one of the motor lead end and the permanent magnet motor.

9. The method of claim 8, further comprising electrically grounding the at least one shorting conductor to earth.

10. The method of claim 8, wherein the plurality of electrical conductors includes an insulation, the method further comprising removing a portion of the insulation and thereby exposing the electrical conductors.

11. The method of claim 8, wherein the at least one condition includes a current, a voltage, or an impedance.

12. The method of claim 8, further including displaying, indicating or annunciating a condition related to the at least one condition.

13. The method of claim 8, wherein the plurality of power cables are overwrapped by a metallic armor, the method further comprising electrically coupling the metallic armor to the shorting conductors shorting the metallic armor.

14. The method of claim 8, wherein electrically coupling the shorting conductors to the bus bar produces a braking torque in the permanent magnet motor.

15. The method of claim 8, wherein the monitoring at least one condition comprises determining if a hazard is present.

16. The method of claim 15, wherein the hazard comprises a shock, a sparking, or an earth fault.

\* \* \* \* \*